United States Patent [19]

Clavier et al.

[11] 4,403,290

[45] Sep. 6, 1983

[54] MACHINE METHOD FOR DETERMINING THE PRESENCE AND LOCATION OF HYDROCARBON DEPOSITS WITHIN A SUBSURFACE EARTH FORMATION

[75] Inventors: Christian M. Clavier; Alberto Khatchikian, both of Ridgefield, Conn.

[73] Assignee: Schlumberger Technology Corporation, New York, N.Y.

[21] Appl. No.: 19,493

[22] Filed: Mar. 12, 1979

Related U.S. Application Data

[63] Continuation of Ser. No. 188,951, Oct. 31, 1971, abandoned.

[51] Int. Cl.³ .................. G06F 15/20; G01V 1/28
[52] U.S. Cl. ........................ 364/422; 73/152; 324/338; 324/351
[58] Field of Search ............. 364/422, 300; 324/324, 324/338, 351; 73/152

[56] References Cited

U.S. PATENT DOCUMENTS

| | | | |
|---|---|---|---|
| 3,590,228 | 6/1971 | Burke | 364/422 |
| 3,638,484 | 2/1972 | Tixier | 73/152 |
| 3,721,960 | 3/1973 | Tinch et al. | 73/152 |

*Primary Examiner*—Jerry Smith
*Attorney, Agent, or Firm*—Amster, Rothstein & Engelberg

[57] ABSTRACT

In accordance with illustrative embodiments of the present invention, techniques are shown for processing well logging data to provide improved results. More particularly, a technique is disclosed for determining the reliability of well logging computations. Another technique is disclosed for making a preliminary pass of the well logging data to automatically select certain input parameters. Still another technique is disclosed for automatically determining the minimum possible hydrocarbon density for each formation level. This last technique is contrasted with the prior art technique which set one minimum value for the entire length of a borehole.

31 Claims, 8 Drawing Figures

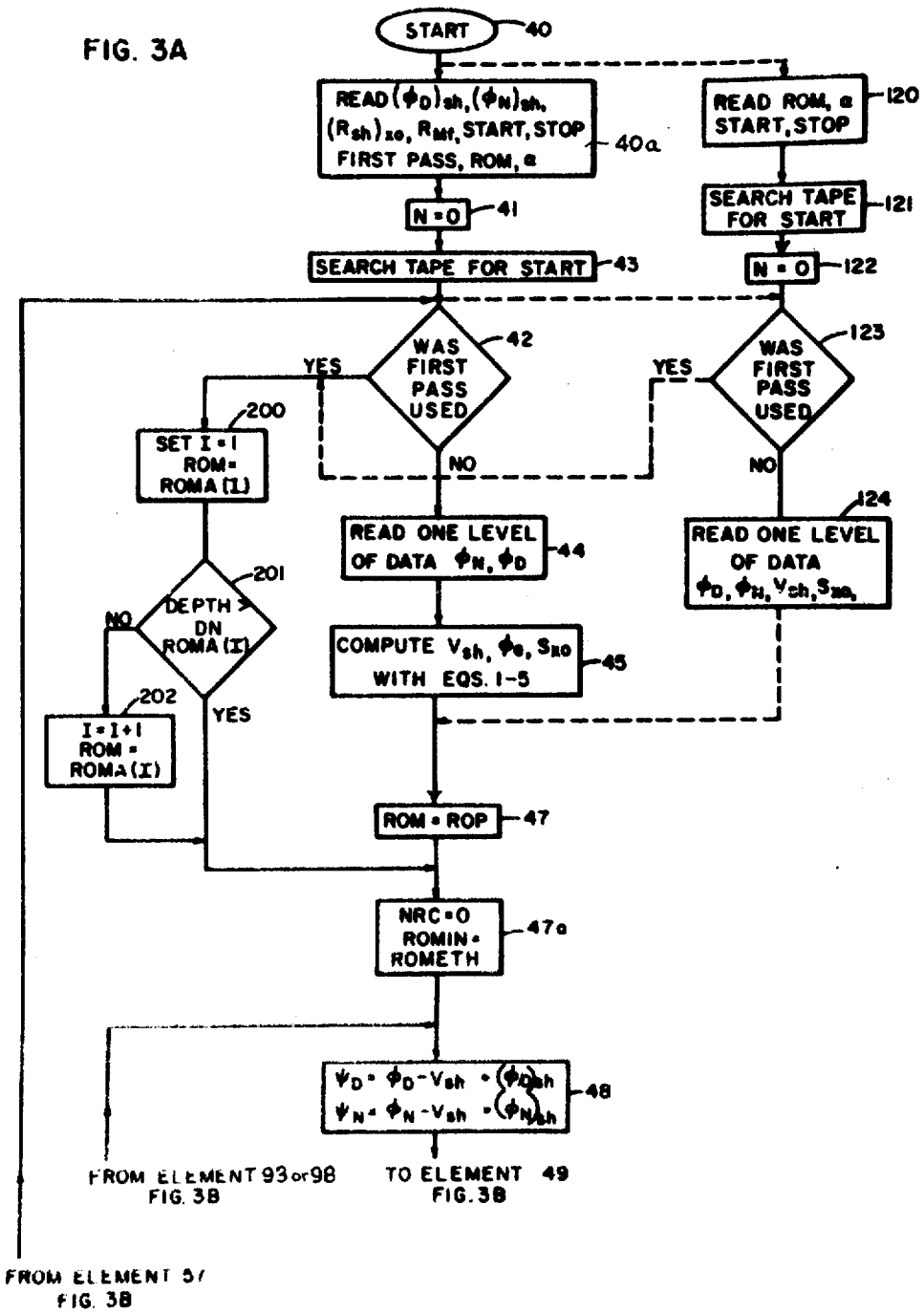

MACHINE METHOD FOR DETERMINING THE PRESENCE AND LOCATION OF HYDROCARBON DEPOSITS WITHIN A SUBSURFACE EARTH FORMATION

This is a continuation of application Ser. No. 188,951 filed Oct. 13, 1971 and now abandoned.

This invention relates to methods of investigating earth formations traversed by a borehole. More particularly, the invention relates to the processing of well logging data derived from apparatus lowered in a borehole for investigating subsurface earth formations.

In seeking to determine the presence and depth of hydrocarbon bearing zones (oil or gas) that may exist in the subsurface earth formations adjacent a borehole drilled into the earth, various types of exploring devices may be lowered into the borehole for measuring various properties of the formations adjacent the borehole. The three principle types of such exploring devices are electrical exploring devices (using either electrodes or induction coils), sonic exploring devices, and radioactivity exploring devices (gamma ray, neutron, etc.).

The electrical exploring devices measure the electrical resistivities (or conductivities) of the earth formations. These electrical resistivities are determined primarily by the amount, distribution and resistivity of the fluids contained in the formation pore spaces. In general there are 2 types of electrical measuring devices. One type gives an indication of the resistivity of the zone radially near the borehole which has been invaded by the drilling mud. This mud invades the formation during the drilling operation and displaces the natural formation fluids. This invaded zone resistivity is called $R_{xo}$. The other type of electrical measuring device measures the resistivity of the virgin or unflushed zone and is called $R_t$.

The sonic exploring devices, on the other hand, measure the time required for sonic waves to travel across a given span of the earth formation. This sonic travel time is determined primarily by the nature of the rock structure and particularly its porosity. Thus, a measure of porosity can be derived from this sonic exploring device. The sonic derived porosity measurement is designated $\phi_S$.

The radioactivity exploring devices measure either the natural radioactivity of the formations or the radioactivity induced therein by bombardment of the formations with radioactivity particles or rays. Two particular radioactivity exploring devices used to investigate formations are the formation density logging tool and the neutron logging tool. The formation density logging tool emits gamma rays which are diffused through the formation and the number of diffused gamma rays reaching one or more nearby detectors are counted to provide a measure of the electron density of the adjacent formation. Moreover, it is known that this electron density is very closely proportional to the bulk density of the formation in substantially all cases. (For cases where this proportionality does not apply, appropriate corrections can be made.) From bulk density, a measure of porosity can be derived and is designated $\phi_D$.

The neutron tool on the other hand utilizes a source for emitting neutrons into the adjacent formations. In one form of neutron device, these neutrons lose energy by collision with atoms in the formation. When the energy level of these neutrons is reduced to the epithermal energy range, they can be detected by a nearby detector which counts the number of epithermal neutrons. Since hydrogen atoms are the only ones whose weights are almost equal to that of the neutron, they are the most effective in reducing the energy level of the neutrons to enable their capture. Thus, it can be said that this type of neutron log is essentially a record of the hydrogen atom density of the rocks surrounding the borehole. Since the formation pore spaces are generally filled with either water or liquid hydrocarbons which both have about the same amount of hydrogen, the neutron log does not distinguish between oil and water, but is primarily affected by the formation porosity. Gas, on the other hand, will alter this porosity determination by the neutron log. The porosity measurement derived from the neutron log is designated $\phi_N$.

In general, none of these measurements taken alone give a direct and positive indication as to the presence or amount of hydrocarbons in the formations or the relative difficulty in removing these hydrocarbons. The various factors which affect each measurement have to be taken into account and an interpretation or deduction made as to the probable existence of hydrocarbons. Among the factors which are considered to be important in determining the location, amount, and ease of removal of oil is the porosity of the formations. Porosity is the fraction of the total volume of a given portion of the formation which is occupied by pores, or void spaces. Other such factors are the make-up of the solid formation material, the water and hydrocarbon saturation, and permeability (ease of fluid to flow in the formation). It is known that by combining the measurements derived from various exploring devices that these factors can usually be obtained. However, when a shaly sand formation is being investigated, the usual interpretation techniques do not apply very well since the responses of most of the tools are affected by shaliness. For example, the true formation resistivity is generally high in an oil or gas bearing formation and low in a water bearing formation. However, in oil or gas bearing shaly sands, the resistivity may very well be low since the shale or clay dispersed in the pore spaces of a sand will tend to have a low resistivity. Moreover, if the formations contain a significant amount of hydrocarbons, and especially gas, additional complications are introduced into the log interpretation process due to the variations in response of the various exploring devices to these hydrocarbons.

Various interpretation techniques have been proposed in the past for analyzing well logging data derived from shaly sand formations. Most of these techniques used well logging data derived from the so called density, neutron and sonic porosity logging tools as well as resistivity logging tools. One example of such an interpretation technique can be found in U.S. Pat. No. 3,638,484 issued to M. P. Tixier on Feb. 1, 1972.

A more recent interpretation technique giving improved results has been developed. It is described in copending application Ser. Nos. 7,716 & 112,004 and filed by Clavier et al on Feb. 2, 1970 and Feb. 2, 1971, respectively now abandoned in favor of continuation application Ser. Nos. 019,491 and 019,492, respectively both filed on Mar. 12, 1979 and also in a paper entitled "Applications of the SARABAND Sand-Shale Technique in North America" by Ratliff et al, SPWLA Twelfth Annual Logging Symposium, May 2-5, 1971. In this interpretation technique, neutron and density porosity data is combined with resistivity, natural radioactivity, and naturally occurring earth potential data to give output indications of various formation parameters. As set forth in these copending Clavier et al patent applications, the equations for neutron and density porosity and invaded zone resistivity can be written and it will be found that there are more unknown or variable parameters than equations. One unknown parameter is $V_{sh}$, the volume of shale. A plurality of shale indicators (such as the natural radioactivity, naturally occurring potential) are then used to establish an upper limit on the value of $V_{sh}$ and an iteration process is used to solve for the unknown parameters.

One such shale indicator is the lowest value of hydrocarbon density (called $\rho_{hy}$), possible in the formation under investigation. If a computed value of $\rho_{hy}$ is lower than this limit value, the computations are adjusted until the computed value of $\rho_{hy}$ at least equals this limit value. Unfortunately, most formation intervals have a value of $\rho_{hy}$ which is much greater than this limit value thus rendering this particular shale indicator practically useless. Moreover, if the value of $\rho_{hy}$ is printed out or used in computing another parameter which is printed out, erroneous answers can result in this print out.

It is therefore an object of the present invention to provide new and improved data processing methods for determining the hydrocarbon density of earth formations.

In this same connection, it would be desirable, and it is another object of the invention, to provide a technique for making a preliminary search of the data to provide input parameters on a zone by zone (vertically speaking) basis. In a more particular sense, it is an object of the invention to do this for the hydrocarbon density input parameter.

In a more general tone, the results produced by any computational method are only as good as the input data used to make the computations. If even some of the input data is invalid, the resulting computations may well be invalid. The degree to which this is true can vary to a great extent depending on the particular computation to be made and the functional dependence of the computations on the various input parameters. For example, slight inaccuracies in some input parameters can have disastrous effects on some computations and, conversely, great inaccuracies in other input parameters can cause slight errors in the same computations. In this connection, it would be desirable to develop a technique for judging the reliability of well logging computations. This would be most meaningful if it were based on a predicted range of errors for the well logging measurements used in making the computations whose reliability is in question. Such a reliability test would be most helpful in connection with computing hydrocarbon density.

It is therefore another object of the present invention to provide such a reliability testing technique.

In accordance with one feature of the present invention, a plurality of measurements representative of a plurality of characteristics of an earth formation are derived and combined to produce a first output computation. They can be derived by a measuring tool in a borehole or, subsequently by a tape reader of a digital computer. The values of the derived measurements are adjusted to new measurement values and these new values are combined to produce a second output computation. The first and second output computations are then combined to produce a representation of the reliability of the first output computation.

In accordance with another feature of the present invention, a preliminary search of the well logging measurements is made to select certain input parameters for use in subsequent well logging interpretation techniques.

In accordance with still another feature of the present invention, a minimum value of hydrocarbon density is automatically determined for various levels throughout the length of the borehole.

For a better understanding of the present invention, together with other and further objects thereof, reference is had to the following description taken in connection with the accompanying drawings, the scope of the invention being pointed out in the appended claims.

Referring to the drawings:

FIGS. 3A and 3B are flow diagram representations of a computer program and will be referred to hereinafter simply as FIG. 3;

Figure 1:
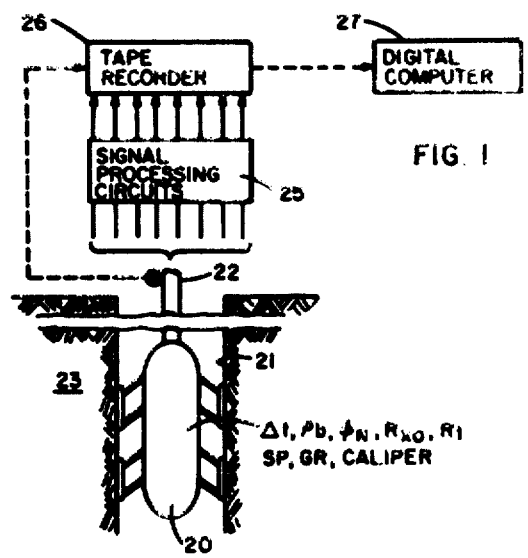
FIG. 1 shows a logging tool in a borehole along with suitable surface equipment for eventually getting the data to a programmable digital computer.

Referring to FIG. 1, there is shown an investigating apparatus 20 located in a borehole 21 on the end of a multiconductor cable 22 which is raised and lowered in a borehole by a suitable drum and winch mechanism (not shown). Investigating apparatus 20 includes exploring devices for obtaining measurements of the acoustic travel time $\Delta t$, bulk density $\rho_b$, the porosity $\phi_N$ derived from a neutron exploring device, the natural gamma ray content GR of a formation, the diameter of a borehole, the spontaneous potential SP, and deep and shallow resistivities, $R_t$ and $R_{xo}$.

An acoustic exploring device for deriving a measure of $\Delta t$ can be found in U.S. Pat. No. 3,231,041 granted to F. P. Kokesh on Jan. 25, 1966. An example of an exploring device for obtaining a measure of the neutron derived porosity $\phi_N$ can be found in U.S. Pat. No. 2,769,918 granted to C. W. Tittle on Nov. 6, 1956. An exploring device for obtaining a measure of the bulk density can be found in U.S. Pat. No. 3,321,625 granted on May 23, 1967 to John S. Wahl. An exploring device for obtaining measurements of the spontaneous potential and deep and shallow resistivity can be found in U.S. Pat. No. 3,453,530 granted to G. Attali on July 1, 1969.

Measurement signals derived from the exploring device 20 are transmitted to suitable signal processing circuits 25 at the surface of the earth. The signal processing circuits 25 prepare the signals for application to a digital tape recorder 26 which converts the well logging signals to digital form for recording on magnetic tape. The resulting magnetic tape is either carried or transmitted via a telemetry link to a digital computer 27 which is programmed in accordance with the teachings of the present invention to process the data in a manner to provide valuable information relative to the nature of the earth formations 23. While all of the measurements to be used in practicing the present invention have, in FIG. 1, been shown derived from one exploring device, it is to be understood that these measurements could be derived from a plurality of exploring devices which are run through the borehole at different times. In this event, the data from each run would be recorded on individual magnetic tapes and the data on each tape would be merged onto a single tape for use by the digital computer 27.

Figure 2:
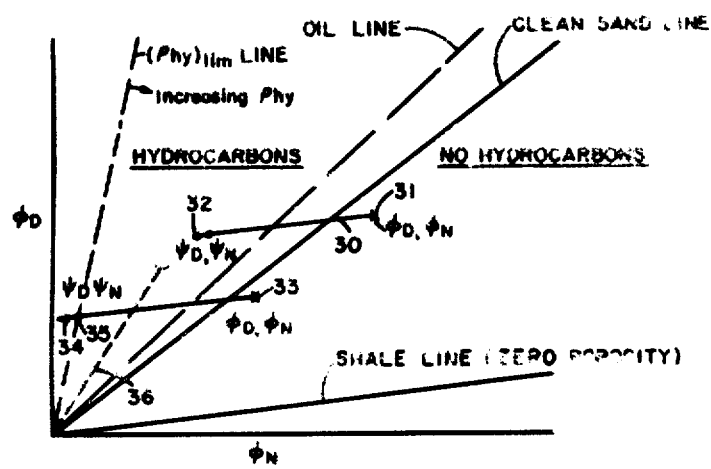
FIG. 2 is a crossplot of $\phi_D$ versus $\phi_N$ and is useful for explaining certain features of the present invention.

Before discussing the techniques of the present invention, it would first be desirable to discuss some general considerations relative to shaly sand formations. A cross plot of the density derived porosity, $\phi_D$ versus neutron derived porosity $\phi_N$ is valuable in evaluating shaly sand formations. Referring now to FIG. 2, there is shown such a cross plot. A shale line can be drawn at a relatively small angle relative to the $\phi_N$ axis. All points plotting on this line will represent pure shale and have a porosity of 0%. Since it is known that neutron and density derived porosity are affected equally by clean (non shaly) water bearing sands, a clean sand line at a 45° angle relative to the $\phi_D$ and $\phi_N$ axes can be drawn.

As set forth in the above mentioned copending Clavier et al patent application, the exact spot where a $\phi_D, \phi_N$ data points fall is dependent on many factors including the effective porosity of the formation, the shale or the clay content, the ratio between water and hydrocarbon content, as well as the type of hydrocarbons present in the formation. In accordance with the techniques set forth in the Clavier et al copending patent application, a plotted $\phi_D, \phi_N$ data point is first corrected for shale content. This is represented in FIG. 2 by the vector 30 which moves the plotted $\phi_D, \phi_N$ data point 31 to a new location 32. On the cross plot, this new point is represented by the parameters $\psi_D, \psi_N$. This vector 30 is parallel to the shale line and its length is proportional to the amount of shale in the formations. The new $\psi_D, \psi_N$ point is representative of the formation from which the original $\phi_D, \phi_N$ data point was derived as if that formation had a complete absence of shale. If this $\psi_D, \psi_N$ point is to the lower right side of the clean sand line, the formation is assumed to be devoid of hydrocarbons. If on the other side of the line, the formation is assumed to be hydrocarbon bearing. Through techniques set forth in the copending Clavier et al applications, this new $\psi_D, \psi_N$ point can be utilized in conjunction with other measurements to compute a number of formation parameters including effective porosity, $\phi_e$, hydrocarbon density $\rho_{hy}$, water saturation $S_w$, and others.

The mathematical analogy to this graphical approach is to simlultaneously solve the following 5 equations:

$$\phi_D = \phi_e + V_{sh}\phi_{D(sh)} + \phi_e(1 - S_{xo})[(\phi_D)_{hy} - 1] \quad (1)$$

$$\phi_N = \phi_e + V_{sh}(\phi_N)_{sh} + \phi_e(1 - S_{xo})[(\phi_N)_{hy} - 1](1 + 2\phi_e S_{xo}) \quad (2)$$

$$(\phi_D)_{hy} = 1 - 5/7 \left(1 - 9\frac{4 - \rho_{hy}}{32 - 5\rho_{hy}} \rho_{hy}\right) \quad (3)$$

$$(\phi_N)_{hy} = 9 \rho_{hy} \frac{8 - 5\rho_{hy}}{32 - 5\rho_{hy}} \quad (4)$$

$$\frac{1}{R_{xo}} = \frac{V_{sh}S_{xo}}{(R_{sh})_{xo}} + \frac{\phi_e^2 S_{xo}^2}{.8 R_{mf}} \quad (5)$$

where
$\rho_{hy}$ is the hydrocarbon density,
$\phi_e$ is the effective, non-shaly porosity of the formation, $(\phi_D)_{sh}$ is the characteristic density derived porosity reading in the shale associated with the sand, $(\phi_N)_{sh}$ is the characteristic neutron derived porosity reading in shale, $(\phi_D)_{hy}$ is the characteristic density derived porosity reading for hydrocarbons, and $(\phi_N)_{hy}$ is the characteristic neutron derived porosity reading for hydrocarbons, $(\phi_D)_{sh}$ and $(\phi_N)_{sh}$ are predetermined constants $S_{xo}$ is the water saturation of the invaded zone, $R_{xo}$ is the resistivity of the invaded zone, $(R_{sh})_{xo}$ is the invaded zone resistivity of shale formations, and $R_{mf}$ is the resistivity of the mud filtrate which invades the invaded zone.

$R_{mf}$ and $(R_{sh})_{xo}$ are predetermined constants.

It can be seen that there are 6 unknown parameters and only 5 equations. To overcome this problem, the computer program of the copending Clavier et al applications uses a plurality of so called shale indicators to define an upper limit on $V_{sh}$. Through a complicated iteration scheme incorporating many testing procedures, these equations are solved for the desired parameters. One of the upper limit shale indicators is the lower limit hydrocarbon density, i.e., the lowest possible hydrocarbon density—the density of methane.

Graphically speaking, this hydrocarbon density limit shale indicator works as follows. If the shale corrected points, $\psi_D, \psi_N$ ended up to the left of a line called the hydrocarbon density-limit $(\rho_{hy\ lim})$ line the computed shale correction (the value of $V_{sh}$) was too great and the data should be appropriately corrected. The hydrocarbon density-limit line is shown in FIG. 2. A value for the hydrocarbon density-limit was established usually by experience or choice and that values was used throughout the entire length of the borehole. The limit value usually corresponded to methane which has the lowest density value of any hydrocarbon. Unfortunately, methane occurs at very few levels throughout the borehole and thus the hydrocarbon density limit line had little effect on the final outcome of the computations. Not only this, the value of hydrocarbon density computed by the program may be erroneous if this limit is not properly set.

To overcome these problems in accordance with certain features of the present invention, the value of hydrocarbon density computed at each depth level is tested for reliability. More will be said about this feature of the invention later. A running average of reliable values of hydrocarbon density is made. For those depth levels where unreliable values are computed, this running average can be used to reevaluate the computations.

Looking at this operation in greater detail, with reference to FIG. 2, assume that the $\psi_D, \psi_N$ point 33 is after correction for shale, moved to the new point 34. It can be seen that this point is to the left of the hydrocarbon density limit line, which indicates that something is wrong since points should not be falling to the left of this line. The value of $V_{sh}$ is then decreased until the point falls on the hydrocarbon density limit line at the point 35. At this time, the reliability of the hydrocarbon density is evaluated and if unreliable, the point is moved to the right along the shale line bit by bit until either a reliable value of hydrocarbon density is computed or the point reaches the line corresponding to the running average of hydrocarbon density, represented by the line 36 in FIG. 2. In other words, the running average density value is taken to be the lower limit value.

If on the other hand, a reliable value of hydrocarbon density is computed, this is to be the true value at that particular depth level and correction to $V_{sh}$ is not necessary (assuming, of course, that the computed density value is higher than the density of methane). For those cases where the shale corrected $\psi_D, \psi_N$ data point falls to the lower right side of the clean sand line, i.e., in the NO HYDROCARBON ZONE, the density of the heaviest possible hydrocarbon (oil) is taken as the value of hydrocarbon density for that particular depth level.

Figure 3B:
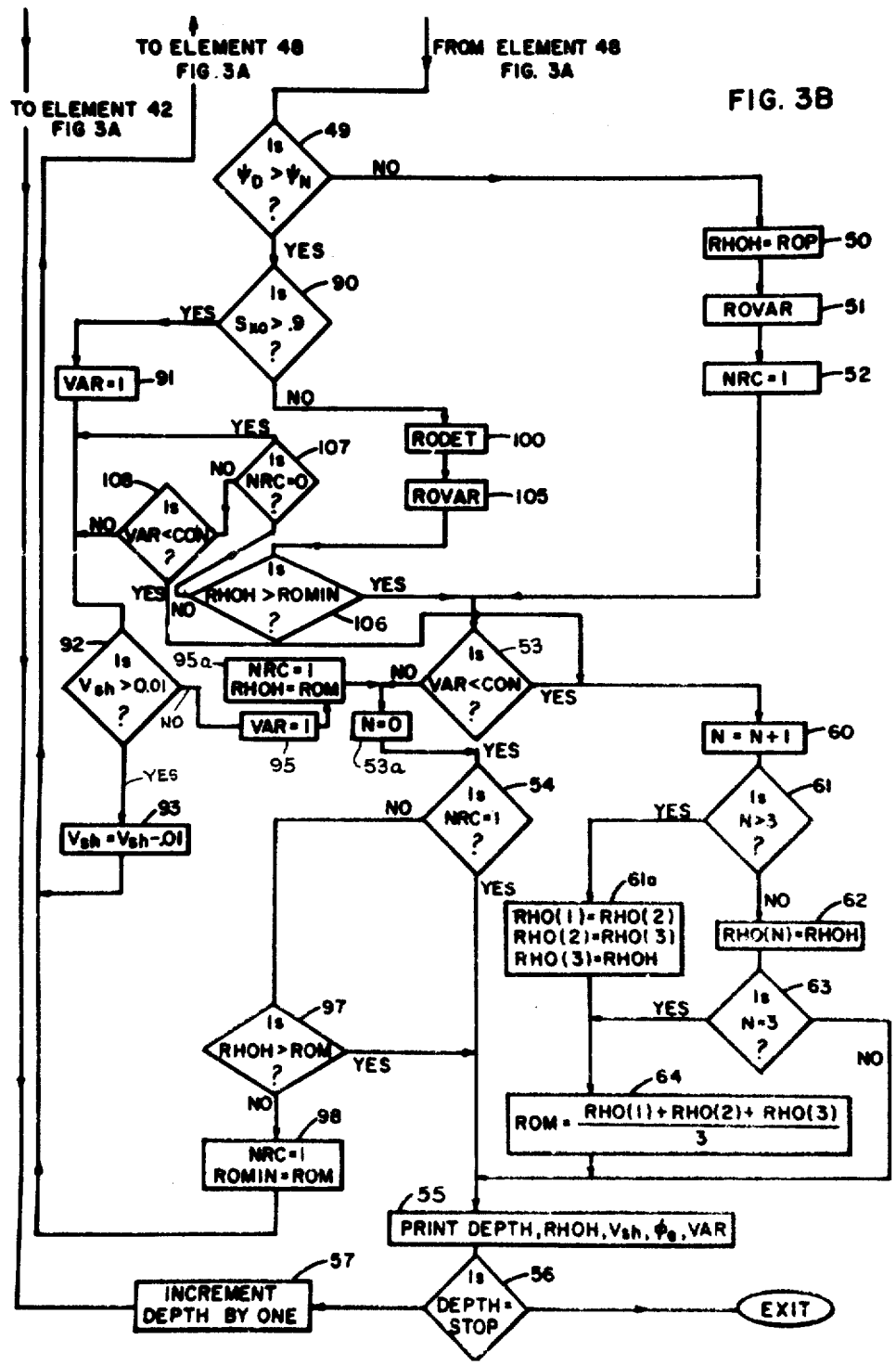

Before turning to the computer flow diagram of FIG. 3 which performs the operations discussed above, it would first be desirable to define here all of the symbols found in FIG. 3 not previously defined:

ROM is the running average hydrocarbon density;
N is a counter used in computing ROM;
START is the first depth of data to be processed;
STOP is the last depth of data to be processed;
ROMIN is the minimum possible value of hydrocarbon density at any particular depth level;
ROMETH is the density of methane;
RHOH is the value of hydrocarbon density established by the program for each depth level;
ROP is the density of oil;
ROVAR is a computer subroutine for computing the reliability of RHOH;
VAR is the reliability factor computed by ROVAR;
NRC is a counter used to control that each depth level goes through one portion of the program only once;
DEPTH is a number representing the particular depth level under consideration at any given time;
RHO(N) is a value of RHOH for a given depth level and is used in computing ROM;
CON is a constant; and
RODET is a subroutine for computing RHOH.

Now turning to FIG. 3, there is shown a flow diagram representation of a computer program for performing the operations discussed above. After entering the program represented by the element 40, constant input parameters $(\phi_D)_{sh}$, $(\phi_N)_{sh}$, $(R_{sh})_{xo}$, $R_{mf}$, START, STOP, and ROM are entered into the computer, as well as other parameters computed by an optional FIRST PASS through the data, as represented by the element 40a. The running average counter N is set equal to 0, block 41. The tape is searched for the START depth as represented by element 43. It is then determined if a first pass was used, as represented by the decision element 42. The first pass will be discussed later. If the first pass was not used, one level of data $\phi_N, \phi_D$ is read from the tape as represented by element 44. The density derived porosity $\phi_D$ is actually a function of the measured formation bulk density, and a number of constant input parameters. If $\phi_D$ is not precomputed as is assumed in FIG. 3, it can be computed by the program in accordance with a well known equation. Next, values of $V_{sh}$, $S_{xo}$ and $\phi_e$ are computed, as represented by the element 45, in accordance with equations (1)-(5).

Next, as represented by the elements 47 and 47a, a counter NRC is set equal to 0 and the parameter ROMIN is equal to ROMETH where, as defined earlier, ROMIN is the minimum value of hydrocarbon density and ROMETH is density of methane. As discussed earlier the lowest possible value of hydrocarbon density is that for methane. Thus the step 47a serves to initially establish this lower limit. If later the program determines that the minimum value should be greater than the density of methane, the parameter ROMIN is changed accordingly. Next as represented by the element 48, values of $\psi_D, \psi_N$ are computed as shown by block 48. It will be recalled from the discussion of FIG. 2 that the computation of the parameters $\psi_D$ and $\psi_N$ corresponds to correcting the original $\phi_D, \phi_N$ data point for shaliness. Thus, in FIG. 2, this corresponds to moving the original $\phi_D, \phi_N$ data point 31 length of the vector 30 to the new $\psi_D, \psi_N$ data point 32.

At this point, all of the initial computations have been made and the input parameters and counters have been initialized. The program can now proceed to analyze these computations in accordance with the techniques of the present invention. The first thing the program does is to determine if the corrected $\psi_D, \psi_N$ data point is in the HYDROCARBON or NO HYDROCARBON ZONE, i.e., to the upper left or lower right of the clean sand line of FIG. 2. This is very easily accomplished by comparing $\psi_D$ with $\psi_N$ as represented by the decision element 49.

We will first consider the case where the decision element 49 has determined initially that hydrocarbons are not present in the depth level presently under investigation. In this case, the answer to the question asked by decision element 49 is NO, and the program proceeds to the program elements 50, 51, and 52. If the $\psi_D, \psi_N$ data point falls in the NO HYDROCARBON ZONE, it is assumed that if there are any hydrocarbons present in the formation, they have a density equal to the highest possible hydrocarbon density, i.e., that for oil. Thus, RHOH, which is the designation for the actual value of hydrocarbon density at each depth level, is set equal to the density of oil, ROP, in element 50. Next the program enters a subroutine designated ROVAR (element 51) which determines the reliability of the hydrocarbon density RHOH. ROVAR computes the parameter VAR which is indicative of this reliability. To prevent breaking continuity of this portion of the discussion, the details of ROVAR will be discussed later. A counter NRC is next set equal to 1, the reasons to be discussed later (see element 52).

If the reliability of the hydrocarbon density computation RHOH is poor, the running average has to be stopped, since it has to be computed for consecutive levels. This is performed by setting N to zero in block 53a. Since elements 61 and 63 require that N be equal to or greater than 3 before a running average can be computed, it will now take three consecutive depth levels of reliable computations before the running average computations will be continued. In the meantime, the last computed value of ROM, considered now to be the last reliable value thereof, is used for all subsequent depth levels. Since NRC was set equal to 1 in block 52, the decision element 54 will route the level to block 55, which prints out the value ROP for hydrocarbon density RHOH as well as the computed reliability VAR, and other computed parameters, for a particular depth level under investigation. The program then proceeds to the next depth level to begin this procedure again for the data at the next depth level. This operation is depicted by the decision elements 53 and 54 which operate to compare the reliability factor VAR with a constant and proceed to the printout element 55 for printing out DEPTH, RHOH, $V_{sh}$, $\phi_e$, and VAR for this depth level. The decision element 54 asks if NRC is equal to one and since the answer is yes (see element 52) the program can proceed to this printout step 55. The decision element 56 asks if the tape has reached the last depth level designated STOP, then increments the DEPTH counter by one (see element 57) and returns to element 42 to consider the next depth level.

Returning back to the decision element 53 if the data is reliable, i.e., if VAR is less than the preselected constant, the program proceeds to compute a running average of hydrocarbon density ROM. To this end, the running average counter N is incremented by one as represented by element 60. Next it is determined if N is greater than 3, as represented by decision element 61. Assuming that this is the first level under consideration, N will be equal to 1 since it was initially set to 0 by element 41. Thus the program will proceed to the element 62 which sets a parameter (RHO) equal to the value of hydrocarbon density for that level, RHOH. The reason for this step will be established later. Next, a decision element 63 asks if N is equal to 3 and assuming it is the first depth level, the answer is NO and the program proceeds to the printout block 55.

Assume now that that reliable value of hydrocarbon density RHOH have been computed for three consecutive depth levels. In this case, decision element 63 will send the program to the running average computing block 64 which, as shown by the equation therein, computes the average of RHOH for the last three levels. For all subsequent depth levels having reliable values of RHOH, the decision element 61 sends the program to step 61a which continually updates the depth levels from which ROM is computed. The program then proceeds to printout block 55 as before.

Before considering the case where the shale corrected data point $\psi_D, \psi_N$ falls in the hydrocarbon zone on the $\phi_D, \phi_N$ cross plot, it would first be desirable to discuss the reliability of computing subroutine ROVAR to compute the reliability of a well logging computation. In accordance with the present invention, the input data from which the particular computation was computed is varied more or less by an amount equal to the tolerance of each input parameter. The particular output parameter whose reliability is sought is recomputed with these adjusted input parameters.

In the case of hydrocarbon density a determination is first made as to whether the computed hydrocarbon density RHOH indicates gas or oil. If gas, the input parameters are adjusted in a different direction than would be the case for oil.

Figures 4, 5:
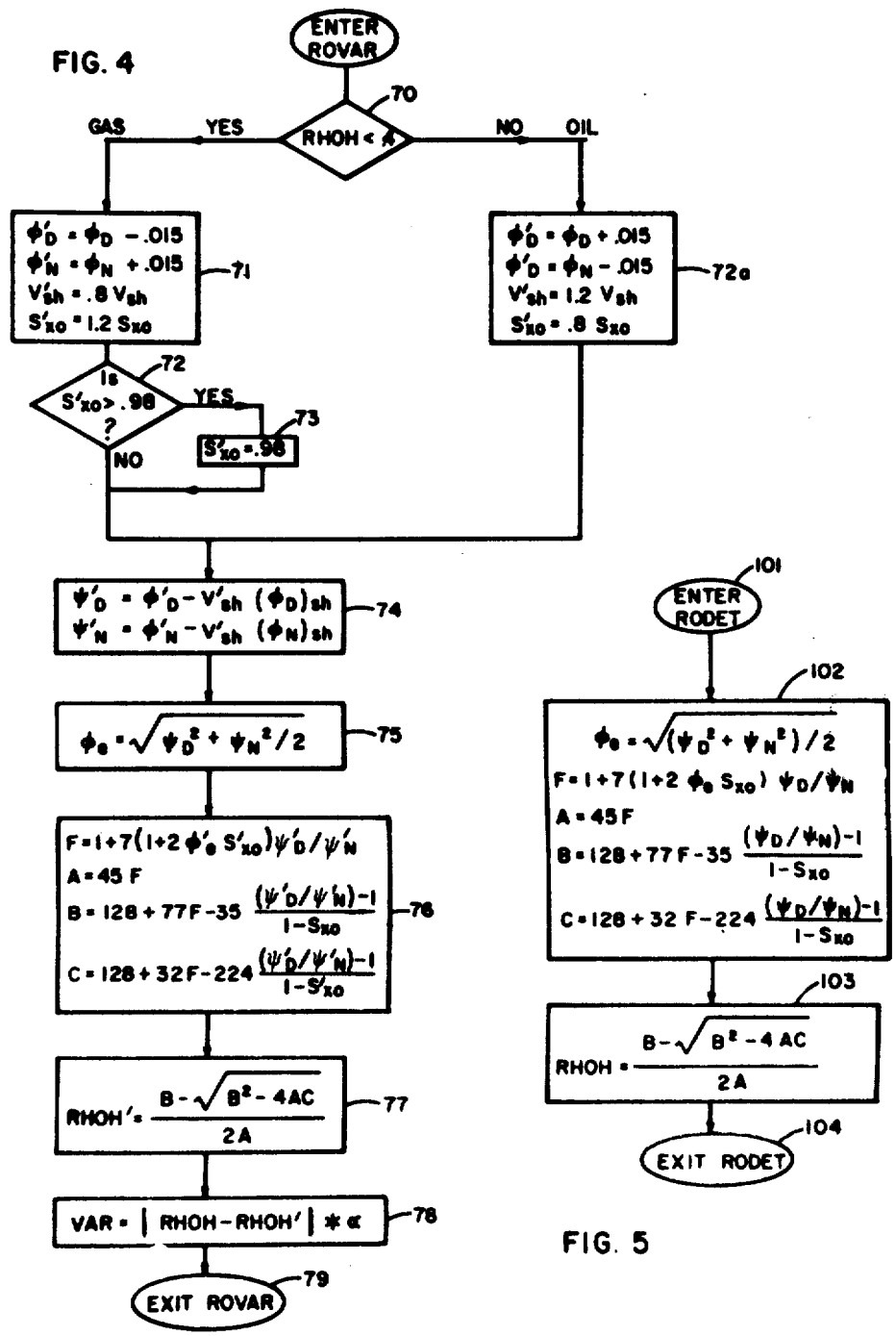
FIGS. 4 and 5 are computer program flow diagrams of two subroutines used in the FIGS. 3 and 6 programs.

Now turning to FIG. 4 to consider this operation in detail, after the program enters the subroutine ROVAR, a decision element 70 determines if the selected value of hydrocarbon density RHOH is less than 0.4. The value 0.4 is considered to be the hydrocarbon density break point between gas and oil. If less than 0.4, the formation is considered to be primarily gas bearing and the program proceeds to decrease the input parameters $\phi_D$ and $v_{sh}$ and increase the parameters $\phi_N$ and $S_{xo}$. The adjusted parameters are designated $\phi_D'$ and $\phi_N'$, $V_{sh}'$ and $S_{xo}'$. This operation is depicted by element 71. The program then proceeds to determine if the recomputed value of the invaded zone water saturation $S_{xo}'$ has been adjusted too far, and if so to set it to a preselected value as represented by elements 72 and 73. The reason for this operation is that water saturation cannot exceed 100%. If the decision element 70 had determined that RHOH indicates oil, these four parameters would have been adjusted by the same amount and in the opposite direction as represented by the block 72. After adjusting the various input parameters, the program then proceeds to compute a new value of hydrocarbon density, designated RHOH', in accordance with the equation given in blocks 74, 75, 76 and 77. The variance is then computed in accordance with the expression given in block 78 where $\alpha$ is a preselected calibration factor. The program then exits the ROVAR subroutine as represented by element 79.

Referring back to FIG. 3, it will be recalled that we had discussed the situation where the shale corrected $\psi_D, \psi_N$ point falls on the NO HYDROCARBON ZONE. Now consider the case where this point falls in the HYDROCARBON ZONE. In this case, the answer to the question asked by decision element 49 will be yes and the program will proceed to the decision element 90 which asks if $S_{xo}$ point is greater than 0.9. If the invaded zone water saturation $S_{xo}$ is greater than 0.9, this indicates that the resistivity measurements are indicating an absence of hydrocarbons which directly contradicts the answer given by computing block 48 and decision element 49. Because of this contradiction, the reliability factor VAR is set equal to 1 (measuring a total lack of reliability and the program proceeds to determine if the value of $V_{sh}$ can be at fault. This function is performed by the decision element 92 which asks if $V_{sh}$ is greater than a value approximating 0. If YES, $V_{sh}$ is decreased by 1% and the program proceeds back to the computing block 48 to recompute $\psi_D, \psi_N$ and a new value of $V_{sh}$. The program continues this loop until either $\psi_N$ becomes greater than $\psi_D$ (element 49) of $V_{sh}$ becomes less than 0.01 (element 92).

Explaining this operation in terms of the cross plot of FIG. 2, the $\psi_D, \psi_N$ point is in effect moved to the right along the shale correction vector 30 until it either passes into the NO HYDROCARBON ZONE (element 49), in which case the resistivity value comes into agreement with the computations of block 48, or the $\psi_D, \psi_N$ point is returned to the original $\phi_D, \phi_N$ data point (element 92).

If the $\psi_D, \psi_N$ point enters the NO HYDROCARBON ZONE (see element 49), the program proceeds to the elements 50, 51, and 52 as discussed earlier. If $V_{sh}$ is decreased to 0.01 or less (see element 92), the variable is set to 1 as represented by the block 95. Since nothing further can be done once $V_{sh}$ is decreased to zero, the program first sets RHOH equal to ROM which is the best possible value of hydrocarbon density whenever the program can not find an acceptable value of RHOH for the particular depth level under consideration. This operation is depicted by element 95a. When the program has to decrease $V_{sh}$ all the way to zero, it is considered that the data is bad so that the running average computed by elements 60–64 is stopped by setting N=0 as explained before.

It will be recalled from earlier discussions that it was assumed that if $S_{xo}$ was found to be greater than 0.9, thus assuming a contradiction, the program was sent to the element 91. Now consider the case where $S_{xo}$ is found to be less than 0.9, i.e., the resistivity tool measurements agree with the computations of block 48. In this case the program enters a subroutine called RODET (block 100) which operates to compute the value of RHOH.

Turning now to FIG. 5, there is shown a flow diagram representation of the RODET subroutine. After entering this subroutine (element 101) the parameter RHOH is computed in accordance with the expressions shown in blocks 102 and 103 and this routine is exited as represented by element 104.

Now turning to FIG. 3, the program enters the ROVAR routine of FIG. 4 which computes the reliability factor VAR, as represented by the element 105. The program then proceeds to determine if this new value of RHOH computed in step 100 is greater than the minimum value of hydrocarbon density, ROMIN which was set equal to the density of methane, ROMETH, in element 47a. This function is represented by the decision element 106. If RHOH is less than ROMIN, i.e., the $\psi_D, \psi_N$ data point is to the left of the hydrocarbon density limit line in FIG. 2, the program enters the loop represented by elements 92 and 93 via element 107 (NRC is 0 at this time) to decrease the value of $V_{sh}$ until RHOH becomes greater than RHOMIN, i.e., the $\psi_D, \psi_N$ data point is brought back to the hydrocarbon density limit line of FIG. 2. When this happens, the answers to decision element 106 will be yes, and the program will proceed to the decision element 53 to determine if the hydrocarbon density computation RHOH is reliable. If it is, this new value of RHOH is used in the running average computations of elements 60–64. The program then prints out the information required by element 55 and goes to the next depth level.

If the computations are unreliable, element 53 causes the program to proceed to element 53a to set N=0 and stop the running average computations. The program then proceeds to elements 97 and 98 via decision element 54 (NRC is 0 at this time). Since the computations have been found to be unreliable at this point, the program determines if the computed value of hydrocarbon density RHOH is greater than the running average value ROM. If RHOH>ROM, the program prints out the desired parameters (element 55) and proceeds to the next depth level. The reason for this procedure is based on the basic assumption that the computed value of hydrocarbon density RHOH is assumed to be the best possible value unless it is less than a value thought to be the minimum possible value for that particular formation. If this assumption is not satisfied, decision element 97 sends the program to block 98 which sets ROMIN equal to ROM and then recycles to element 48 to repeat the process over again this time using the running average value ROM in the test given by element 106.

In step 106 this time, the running average value ROM replaces the minimum hydrocarbon density value ROMIN. If RHOH is greater than this new value of ROMIN, namely ROM, the program makes no further corrections and proceeds as before to decision element 53. If the RODET subroutine has still not computed a reliable value of hydrocarbon density RHOH, decision element 53 causes the program to print out the values required by block 55 and go to the next depth (since NRC has been set to 1 by block 98 during the previous sweep through block 98, the answer to step 54 will be yes).

Returning to the decision element 106, if the new value of ROMIN, i.e., the value ROM set in block 98, is still greater than RHOH, the program proceeds to the decision element 107, where the answer is NO, since NRC was set equal to 1 in block 98, and then to decision block 108. If the answer from decision block 108 is NO, meaning that the computation of RHOH is still unreliable, the program will proceed to adjust the value of $V_{sh}$ unless it is already less than 0.01. In this case the program will eventually find its way to the print out element 55 and go to the next depth level through one of the paths previously discussed. On the other hand, if the result of decision block 108 is YES, the level will proceed to block 60 for a computation of the running average.

By way of summary of the operation of the FIG. 3 flow diagram, blocks 40 through 48 read the input data, initialize the input parameters and counters and make the initial computations of $\psi_D$, $\psi_N$, $S_{xo}$, $V_{sh}$ and $\phi_e$. The decision element 49 determines if these computations have found the zone to be hydrocarbon bearing or not. If not hydrocarbon bearing the value of hydrocarbon density is set equal to the density of oil, ROP, and the reliability of this assumption is computed by the ROVAR routine block 51. Element 53 determines if the reliability factor VAR is suitable, and if so sends the program to the running average procedure given by element 60–64. A running average is not computed unless reliable values of hydrocarbon density RHOH are found for three consecutive depth levels. The decision elements 61 and 63 perform this function. If not reliable, the program prints out the computations already made as a best possible data for that depth level with RHOH=ROP and proceeds to the next depth level.

For the cases where the computed $\psi_D$, $\psi_N$ point falls in the hydrocarbon zone (see element 49) the program checks the invaded zone water saturation parameter $S_{xo}$ to determine if the resistivity data is in agreement with the computations made in block 48 (see element 90, and if not in agreement, the reliability factor VAR is set equal to 1 (element 91) and $V_{sh}$ is decreased (elements 92 and 93) until either $\psi_D$ becomes equal or less than $\psi_N$ (block 49) or $V_{sh}$ becomes less than 0.01 (element 92) whereupon the computations for that level are printed out and the program proceeds to the next depth level (elements 55–57).

If $S_{xo}$ is less than 0.9, (element 90) the program computes value for hydrocarbon density RHOH with the subroutine RODET and its reliability is computed by the subroutine ROVAR (elements 100 and 105). If this new value of hydrocarbon density RHOH is less than a minimum value assumed for hydrocarbon density, ROMIN, which is initially set equal to the density of methane (element 47a), the program decreases $V_{sh}$ until the two values are equal (see elements 92 and 93). After this, if the reliability of RHOH is bad (element 53), the program sets ROMIN to the running average value of hydrocarbon density ROM (or, if no running average has been computed yet, to the density of oil, ROP (see element 47) and proceeds to determine if RHOH is less than this value (element 106). If it is less, $V_{sh}$ is decreased until the two are equal and then exits the program for this depth level through element 53 as explained before.

Instead of computing the input parameters $V_{sh}$, $S_{xo}$ and $\phi_e$, the program can alternatively use the values for these parameters, as well as values of $\phi_N$ and $\phi_D$, computed by the program described in the copending Clavier et al application. This alternative is represented by the elements 120–124 of FIG. 3 and the corresponding dashed lines connecting the elements of this path to the program elements previously described.

The computed program depicted in FIG. 3 used a running average value of hydrocarbon density, ROM, as the most likely value of hydrocarbon density for use by the program at any particular depth level where RHOH proves to be unreliable. The situation could arise where a rash of depth levels giving unreliable hydrocarbon density computations are encountered in a bottom portion of a sand zone separated from another sand zone by a low permeability shale zone. In this case, the hydrocarbon density between the two sand zones could be quite different and because of the unreliable computations, three consecutive depth levels of reliable computations are not encountered until the program reaches the top of the sand formation. In this case, the value of ROM will reflect the average hydrocarbon density of a sand formation other than the one presently under investigation, thus leading to possible erroneous results. In this connection, it would be desirable to have a preliminary pass of the data to select the best possible values of hydrocarbon density for each formation interval. By so doing, when the program considers the bottom portion of a sand formation separated by an impermeable shale, a reliable value of ROM can be available for use in the above situation. In accordance with other important features of the present invention, this is accomplished by the program represented in FIG. 6.

Figure 6:
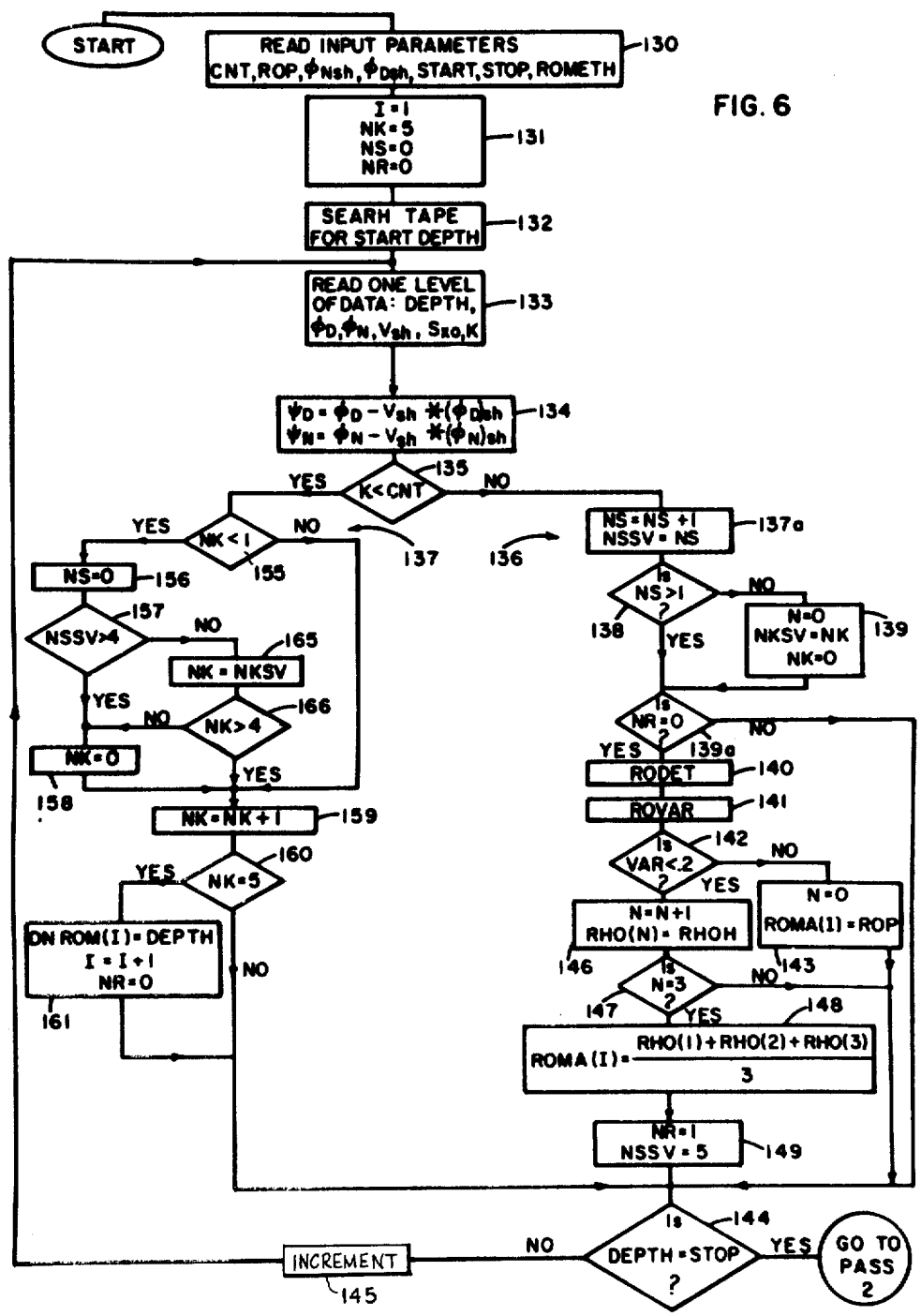
FIG. 6 is a flow diagram representation of a computer program.

The FIG. 6 program operates to identify sand and shale formations and to compute a reliable value of hydrocarbon density from reliable data derived as deep as possible in each sand formation. Each time the program finds a shale formation thick enough to act as a barrier for passage of hydrocarbons between adjacent sand formations, it declares that depth level to be the boundary between adjacent intervals having potentially different values of hydrocarbon density and begins a search for a new value of hydrocarbon density for the new interval. Before a new value of hydrocarbon density for a particular interval can be selected, there must be three consecutive depth levels within the interval which have reliable values of hydrocarbon density, whereupon an average of the values for the three depth levels is taken to be the value for that particular interval. The program includes suitable logic to ensure that occasional bad data or thin formations do not effect the results thereby insuring continuity of the results.

Before proceeding with the description of the FIG. 6 computer program, it would be desirable to first define a number of symbols used in this program and not previously defined. These definitions are set forth below:

N is a counter giving the number of consecutive depth levels for which reliable values of RHOH have been computed;
NS is a counter giving the number of consecutive sand levels;
NK is a counter giving the number of consecutive shale levels;
NSSV is a counter giving the number of consecutive sand levels which are saved for later use;
NKSV is a counter giving the number of consecutive shale points saved for later use;
NR is an indicator which is 0 when an average value of hydrocarbon density, designated ROMA(I), has not yet been computed for a given interval and is one when such a value has been computed;
I is a counter for the number of formation intervals;
DNROM(I) gives the last or highest depth level of any interval I;
ROMA(I) is the declared value of average hydrocarbon density for any interval I, and
CNT is a constant.

The first pass program of FIG. 6 begin by reading the input parameters ROP, $(\phi_N)_{sh}$, $(\phi_D)_{sh}$, START, STOP, CNT and ROMETH as represented by block 130. Next a number of counters are initialized, namely, I is set equal to one, NK is set equal to 5, NS is set equal to 0, and NR is set equal to zero as represented by block 131.

Next, the tape is searched for the START depth as represented by element 132 and one level of data is read, as represented by block 133. This data is DEPTH, $\phi_D$, $\phi_N$, $V_{sh}$, $S_{xo}$, and K. K is the formation permeability. All of the parameters can be computed with the program described in the copending Clavier et al applications, or if desired, can be separately computed in the same manner as discussed in connection with FIG. 3. Next, $\psi_D$ and $\psi_N$ are computed in the same manner as in FIG. 3, as represented by block 134.

At this point all of the necessary data has been computed for the program to define the sand-shale levels and compute their corresponding values of hydrocarbon density. Since sand is generally permeable and shale is generally impermeable, the computed permeability K is utilized to distinguish between sand and shale formations. This test is represented by decision element 135. If K is higher than a predetermined constant CNT thus indicating sand, the program follows the loop 136. If a shale, it follows the loop 137.

Assuming first that a same formation zone has been found, the sand counter NS is incremented by one and this new value is saved (i.e., NSSV=NS) as represented by element 137. A decision element 138 determines if this is the first level of a sand zone and if so, proceeds to a block 139 which sets the counter N equal to 0, sets the counter NKSV to NK, and thereafter sets NK to 0. The reasons for these operations will become apparent later. A decision element 139a determines if the NR indicator is zero or one. The state of NR, zero or 1, defines whether a value of hydrocarbon density ROMA(I) has been computed for interval I presently under consideration. If a value has not been computed, the program enters the subroutines RODET and ROVAR (block 140 and 141) and performs the same functions discussed earlier, namely, computes a value of hydrocarbon density RHOH for that particular level under consideration and then computes its reliability factor VAR.

If the reliability of RHOH is poor, block 143 causes the counter N to be set to 0 and sets ROMA(I) to the density of oil, ROP. This insures that a value of hydrocarbon density will be available for any interval even if the data is totally unreliable. The program then proceeds to decision element 144, which asks if the last depth level has been considered and if not, the DEPTH counter is incremented by one level (element 145) and the program starts again at step 133.

Returning to decision element 142, if the reliability factor VAR was satisfactory, the counter N is incremented by one and the parameter RHO(N) is set equal to the value of hydrocarbon density for this depth level, i.e. RHOH, as represented by element 146. If N is not yet equal to 3 (see element 147), the program goes to the next depth level via elements 144 and 145. If reliable values of RHOH are computed for three consecutive depth levels, decision element 147 causes a value ROMA(I) to be computed as the average of last three consecutive values of the hydrocarbon density RHOH. If values of hydrocarbon density RHOH from two consecutive depth levels are computed and a third depth level produces a non-reliable value, the decision element 142 will take the program to the block 143 which sets the consecutive reliable data counter N to zero. By setting N=0, three consecutive levels having reliable values must be found before a value of ROMA(I) can be computed.

After computing the value ROMA(I), the program sets the counter NR equal to one and the counter NSSV equal to 5 as represented by element 149 and then proceeds to the next depth level. By setting NR=1, the decision element 139a will cause the program to bypass the computational blocks 140, 141, and 148. This means that the three depth levels used for computing ROMA(I) will be the deepest (or first encountered because wells are logged from bottom to top) three consecutive levels having reliable values of RHOH in the interval under consideration. The reason for setting NSSV equal to 5 will beocme apparent later.

Now consider what happens when a shale zone is encountered and the program proceeds along the path 137. First a decision element 155 determines if this is the first shale level after a sand level. (If it is, NK will be zero from block 139.) If this is the first shale level, after a sand level, the sand counter NS is set equal to zero (element 156) and a determination is made if NSSV is greater than 4 (element 157). If the preceeding sand zone consisted of more than five depth levels or if a value of average hydrocarbon density ROMA(I) was computed (see element 149), NSSV is greater than 4 and the program proceeds to set the shale counter NK to 0 (element 158). The reason for this will be apparent later. The program then increments NK by one as represented by element 159, and if NK is not equal to 5 (element 160), the program proceeds to the next depth level. If five consecutive shale depth levels are found, the program proceeds to the block 161 which sets the parameter DNROM(I) equal to the depth presently being considered. Since it is considered that five consecutive shale levels constitute an impermeable shale barrier, thus allowing for a different value of hydrocarbon density above this barrier, DNROM(I) is set equal to DEPTH and the interval counter I is incremented by one. NR is also set equal to zero to allow the program to compute a new average value of hydrocarbon density ROMA(I) in the next sand formation (see element 139A).

If a shale level is the first level after starting the program, NK will be 5 (see element 131) and a shale barrier will not be declared here by block 161, because of elements 155, 159 and 160 (NK will be equal to 6 in this case).

If the number of saved sand levels NSSV set by element 137A in the last sand interval is equal to or less than 4, the decision element 157 causes the program to set the shale counter NK equal to the saved value of consecutive shale points NKSV. NKSV was set initially in block 131 or by element 139 in the first level of the last sand. If the new value of NK is less than four (element 166), the program proceeds to set NK equal to zero and then proceeds to the elements 159 and 160. If NK is greater than four, the program proceeds directly to elements 159, 160. The reasons for these operations will become apparent later.

Figure 7:
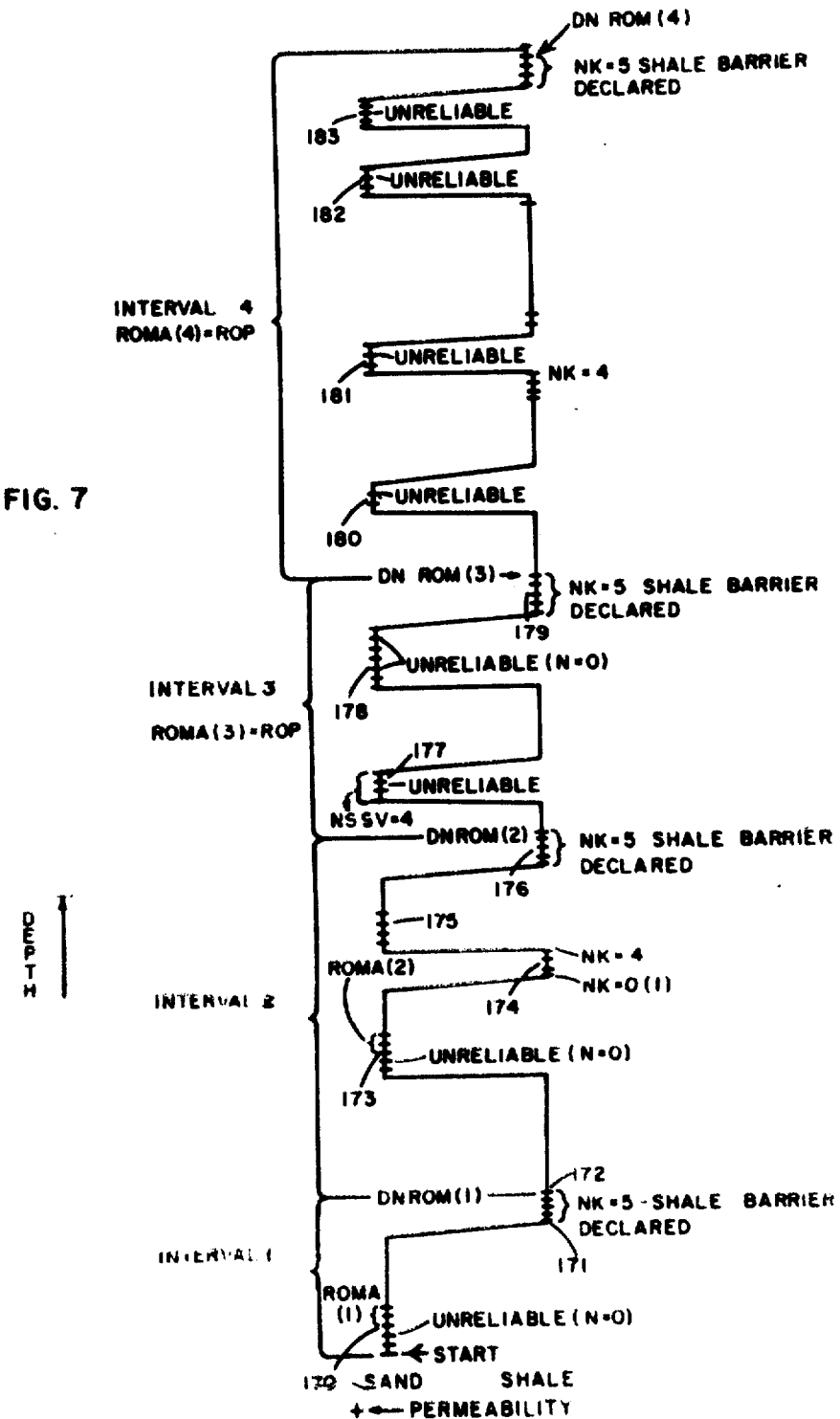
FIG. 7 is a log of formation permeability k vs. depth and is useful for explaining the operation of the FIG. 6 computer program.

To understand how the FIG. 6 program functions, refer to FIGS. 6 and 7 in conjunction. FIG. 7 is a log of permeability versus depth, where depth is decreasing from bottom to top, i.e., the top of the page is towards the surface of the earth. Permeability increases from right to left in FIG. 7 such that sand will plot to the left and shale to the right. It is to be understood that an actual log of permeability will not appear as clean as that shown in FIG. 7, but the log is shown this way solely to illustrate how the program of FIG. 6 operates. Since boreholes are logged from bottom to top, we will start at the bottom of FIG. 7 and proceed upward.

Consider that the first formation encountered is a sand formation. Furthermore consider that at the START depth, a computed value of hydrocarbon density RHOH is reliable. Thus in FIG. 6, the program would pass through the decision element 142 to the decision element 147 and then to the next depth level since N is only equal to one at this point (i.e., it was set equal to 0 in block 139 and then to one in block 146). At the second depth level, which also produces a reliable value of RHOH, the program does the same thing again. Now as illustrated in FIG. 7 assume that the third depth level 170 produces an unreliable value of hydrocarbon density RHOH. In this case the answer to decision element 142 will be NO and N will be set to zero. Thus it will now take 3 consecutive depth levels of reliable RHOH before an average value of hydrocarbon density ROMA(I) for the first (I=1) interval can be computed. (I was initially set equal to one for block 131.) This is the situation depicted in FIG. 7 by the three consecutive depth levels following the unreliable level 170. Thus an average value of hydrocarbon density for the first interval, namely, ROMA(I) is computed by the expression in block 148 using the three values of hydrocarbon density from the fourth-sixth levels shown in FIG. 7.

Now assume that at the depth level 171, a shale zone is encountered. In this event, the program will pass via decision element 135 to decision element 155. Since NK is zero at this time (see element 139), the program will pass to elements 156 and 157. Since more than four sand levels have just been considered, NSSV, the number of consecutive sand points saved is greater than four and the program will proceed to element 158 where NK will be set equal to zero and subsequently incremented by one by element 159. The program then proceeds to the next depth level. The next depth level which in FIG. 7 is also a shale level, will cause the program to go directly from element 155 to element 159 since NK no longer will be less than one. The program will, in the example of FIG. 7, proceed in this manner for five consecutive shale depth levels at which time the decision element 160 will cause the program to go to element 161. Element 161 declares a shale barrier thus setting DNROM(1) equal to the fifth depth level of the shale zone and the interval counter I is incremented to 2. Moreover, the indicator NR is set to zero so that a new average value of hydrocarbon density can be computed for the next interval. (See element 139a.) Subsequently, at the depth level 173 in FIG. 7, a sand zone has again been found whereupon a new average value of hydrocarbon density ROMA(2) is computed after three consecutive reliable levels as shown in FIG. 7.

Now consider what happens when a short shale zone of less than five depth levels is encountered in the midst of a sand interval. In FIG. 7 this happens in the shale zone 174. At the first level of the shale interval 174, NK is set to 0 by element 158 and, at the same level, to 1 by element 159. After four consecutive shale levels in the zone 174, a sand level 175 is encountered. Since NK was never able to climb to five, a shale barrier could not be declared by element 161 and thus this short shale zone 174 will be ignored by the program. Eventually as represented by the shale inerval 176, five consecutive shale levels are encountered and a shale barrier is declared at the fifth such level. Thus a depth flag DNROM(2) is set and the program proceeds to interval three.

In interval three, four consecutive levels are encountered in the first sand zones, 177. As shown in FIG. 7, the second level of this short zone has an unreliable value of hydrocarbon density RHOH, and thus an average value of hydrocarbon density ROMA cannot be computed at this time. Subsequently, a 10 or 15 level shale zone is encountered and then another sand zone 178. As seen in FIG. 7 three consecutive depth levels having reliable values of RHOH cannot be found in interval 178 either. Eventually, five consecutive shale levels 179 are found so that another shale barier can be declared and the depth indicator DNROM(3) set. It will be noticed that during interval 3, an average value of hydrocarbon density ROMA was never computed. However, during the first sand level in interval 3, ROMA(3) was set equal to the density of oil ROP (see element 143) and was never changed by element 148. Thus, the value of ROMA in interval 3 is the density of oil, ROP.

Next a plurality of sand zones, 180, 181, and 182 are encountered, each of which is unable to produce three consecutive depth levels of reliable values of hydrocarbon density RHOH. Because of this the decision element 157 will cause the element 165 to continually reset the shale counter NK to the value previously saved (NKSV) thus preventing the program from finding its way to the element 158 to set NK=0. Therefore the answer to decision element 160 will never be yes, because NK will always be greater than five and a shale barrier will not be declared. It is the operation of elements 157, 139, 165 and 166 preventing NK from being set to zero in shale zones in the presence of short sand zones that enables the program to ignore such short sand zones such as 180, 181 and 182. The elements 139, 157, 165, 166, 158, 159 and 160 do the same thing for short duration shale beds in a sand zone as was discussed earlier in connection with the shale zone 174.

Finally, at the sand zone 183, five consecutive sand levels are found such that NSSV is set to five. The next time a shale interval is encountered, decision element 157 will cause the program to set NK to zero without first saving NK (i.e., without going to block 165). Thus, in the next zone 184 which has five consecutive shale levels, a shale barrier is declared and the depth indicator DNROM(4) is set. Moreover, ROMA(4) is set equal to ROP since a ROMA value was never computed in step 148.

It can thus be seen that the program of FIG. 6 will operate to filter out all short duration sand or shale intervals and thus insure continuity of the computations. This means that occasional unreliable measurements or thin formation beds will not cause a shale barrier to be declared.

Turning now to FIG. 3, the elements 200–202 operate to utilize the data computed by the program of FIG. 6 in the program of FIG. 3. More particularly, if a first pass was used, the decision element 42 will operate to set the interval counter I to 1 and ROM to ROMA(I). The program then proceeds exactly in the same fashion as discussed earlier. As soon as the depth level corresponding to DNROM(I) is reached, the decision element 201 will send the program to the element 202 which increments the interval counter I by one and thereafter sets ROM equal to the average hydrocarbon density value for this new interval. This process repeats itself over and over again for each interval. Because of the above operation, whenever element 98 sets ROMIN to ROM, ROM will be the best possible value thereof.

In other words, if a rash of levels having unreliable hydrocarbon density computations RHOH is encountered near the bottom of a sand formation, ROMA(I) can be used as the value of ROM until a running average value of ROM can be established by step 64. This will insure that the hydrocarbon density limit shale indicator will be useful for most levels.

From the foregoing, it can be seen that a number of new techniques for well logging data processing have been invented. Firstly, a technique has been invented for evaluating the reliability of well logging computations. This has been accomplished by varying the input parameters by a prescribed amount and recomputing the parameter whose reliability is to be evaluated. Then, the recomputed value is compared with the initially computed value to give an indication of reliability.

Secondly, a technique has been invented for improving the hydrocarbon density limit shale indicator. This has been accomplished by using as the hydrocarbon density limit value, a running average value of those hydrocarbon density computations found reliable by the first technique. This running average value replaces the density of methane as the limit value.

Thirdly, a technique has been invented for making a preliminary pass of the data to select input parameters on an interval by interval basis for subsequent use by a well log interpretation computer program. This in effect gives the interpretation program a look ahead capability which it would not otherwise have when operating on a level-by-level basis.

It is to be understood that modifications could be made to the implementation of the above three techniques. For example, they could be interwoven in the computer program set forth in the copending Clavier et al applications. Thus, the parameter selection techique of FIG. 6 could be placed in sweep 2 of the Clavier et al computer program and the hydrocarbon density limit adjustment feature of FIG. 3 in sweep 3 of that computer program.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:

(a) providing a first plurality of electrical signals representative of characteristics of the formation over a plurality of depth levels of the borehole derived from signals responsive to the reaction of the subsurface earth formation to a plurality of probing signals emitted into the formation from a source of such probing signals located in said investigating device;

(b) combining said first electrical signals to produce first output electrical signals representative of formation characteristics for a plurality of formation depth levels;

(c) adjusting the first electrical signals to produce second electrical signals;

(d) combining said second electrical signals to produce second output electrical signals representative of formation characteristics; and (e) comparing said first and second output electrical signals to produce a record which extends over a plurality of depth levels of further electrical signals representative of the reliability of the first output electrical signals for a plurality of depth levels of the formation, whereby said further electrical signals can be further combined to produce other electrical signals from which the presence and location of hydrocarbon deposits in the earth formation for a plurality of depth levels can be accurately determined.

2. The method of claim 1 further comprising the step of comparing said first output electrical signals with a limit value and the step of adjusting of the value of said derived electrical signals comprises the step of adjusting said derived electrical signals to a first new value when the value of said first output electrical signals exceed said limit value and adjusting said derived electrical signals to a second new value when the value of said first output electrical signal is less than said limit value.

3. The method of claim 2 wherein first and second output electrical signals are representative of the hydrocarbon density of the formation.

4. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:

(a) providing a first plurality of electrical signals representative of characteristics of the formation over a plurality of depth levels of the borehole derived from signals responsive to the reaction of the subsurface earth formation for a plurality of probing signals emitted into the formation from a source of such probing signals located in said investigating device;

(b) combining at least some of said first electrical signals to produce a plurality of first output electrical signals representative of formation characteristics for a plurality of formation depth levels;

(c) producing further electrical signals representative of the reliability of said first output electrical signals and selecting therefrom reliable output electrical signals; and (d) combining at least some of said reliable output electrical signals to produce a record which extends over a plurality of depth levels of second output electrical signals for a plurality of depth levels of the formation, whereby said second output electrical signals can be further combined to produce other electrical signals from which the presence and location of hydrocarbon in the earth formation for a plurality of depth levels can be accurately determined.

5. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:

(a) providing a first plurality of electrical signals representative of characteristics of the formation over a plurality of depth levels of the borehole derived from signals responsive to the reaction of the subsurface earth formation to a plurality of probing signals emitted into the formation from a source of such probing signals located in said investigating device;

(b) combining for a plurality of selected depth levels at least some of said first electrical signals to produce a plurality of electrical signals representative of values of a formation characteristics at the plurality of selected depth levels which define a formation interval;

(c) producing electrical signals representative of the reliability of the value of the formation characteristics for the plurality of selected depth levels and selecting the reliable values; and (d) combining at least some of said electrical signals representative of reliable values to produce a record which varies with depth of an output electrical signal representative of the formation characteristic for the plurality of selected depth levels which define said formation interval whereby said output electrical signals can be further combined to produce other electrical signals from which the presence and location of hydrocarbon deposits in the earth formation for a plurality of depth levels can be accurately determined.

6. The method of claim 5 wherein said output electrical signals are the average of a plurality of consecutive reliable values of said formation characteristic.

7. The method of claim 6, wherein said formation characteristic is of the hydrocarbon density of the formation.

8. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:

(a) providing a first plurality of electrical signals representative of characteristics of the formation over a plurality of depth levels of the borehole derived for signals responsive to the reaction of the subsurface earth formation to a plurality of probing signals emitted into the formation from a source of such probing signals located in said investigating device;

(b) combining at least some of said first electrical signals to produce further electrical signals representative of a first and a second characteristic for a plurality of formation depth levels;

(c) producing for at least some of the depth levels having the first characteristic, electrical signals representative of a third formation characteristic and selecting electrical signals representative of reliable values of the third formation characteristic for a plurality of depth levels; and (d) selecting at least one formation interval having a plurality of consecutive depth levels with reliable values of the third formation characteristic and a plurality of consecutive depth levels having the second formation characteristic whereby electrical signals representative of formation characteristics within the selected formation interval can be further combined with other electrical signals to produce other electrical signals from which the presence and location of hydrocarbons in the earth formation for a plurality of depth levels can be accurately determined.

9. A method of claim 8 wherein the third formation characteristic is the hydrocarbon density of the formation.

10. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:
(a) providing a first plurality of electrical signals representative of characteristics of the formation over a plurality of depth levels of the borehole derived from signals responsive to the reaction of the subsurface earth formation to a plurality of probing signals emitted into the formation from a source of such probing signals located in said investigating device;
(b) combining at least some of said first electrical signals to produce electrical signals representative of a characteristic of the formation for a plurality of formation depth levels defining a borehole section;
(c) comparing said electrical signals representative of the formation characteristic with a predetermined limit value;
(d) producing for at least some of the depth levels in the borehole section second electrical signals representative of a formation characteristic and selecting reliable values of the second formation electrical signals for the borehole section; and
(e) selecting at least one formation interval within the borehole section having both a plurality of consecutive depth levels with reliable values of the second formation electrical signals and a plurality of consecutive depth levels wherein the first formation electrical signals is less than the limit value whereby electrical signals representative of formation characteristics within the selected formation interval can be further combined with other electrical signals to produce other electrical signals from which the presence and location of hydrocarbons in the earth formation for a plurality of depth levels can be accurately determined.

11. The method of claim 10 wherein said first formation electrical signals are representative of the permeability of the formation and the second formation electrical signals are the hydrocarbon density of the formation.

12. The method of claim 11 further comprising the steps of combining said reliable electrical signals representative of the second formation electrical signals to produce output electrical signals representative of the value of the parameter for the defined interval.

13. A method of claim 12 wherein said output electrical signals represent the average value of the reliable values of the second parameter for the lowest depth levels in the formation interval.

14. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:
(a) combining at least some of said first electrical signals representative of characteristics of the formation over a plurality of depth levels of the borehole derived from signals responsive to the reaction of the subsurface earth formation to a plurality of probing signals emitted into the formation from a source of such probing signals located in said investigating device;
(b) combining at least some of said first electrical signals to produce electrical signals representative of a characteristic of the formation for a plurality of formation depth levels defining a borehole section;
(c) comparing said electrical signals representative of the formation characteristic with a predetermined limit value; and
(d) selecting at least one formation interval within the borehole section having a plurality of consecutive depth levels wherein the first electrical signals are greater than the limit value and a plurality of consecutive depth levels wherein the first electrical signals are less than the limit value whereby electrical signals representative of formation characteristics within the selected formation interval can be further combined with other electrical signals to produce other electrical signals from which the presence and location of hydrocarbons below the earth formation for a plurality of depth levels can be accurately determined.

15. The method of claim 14 wherein the formation characteristic is the permeability of the formation and the plurality of depth levels is at least five consecutive depth levels.

16. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:
(a) providing a first plurality of electrical signals representative of characteristics of the formation over a plurality of depth levels of the borehole derived from signals responsive to the reaction of the subsurface earth formation to a plurality of probing signals emitted into the formation from a source of such probing signals located in said investigating device;
(b) combining at least some of said first electrical signals to define a formation interval having a plurality of depth levels including at least a first and second section each including a plurality of depth levels having different formation characteristics; and (c) combining for said first section at least some of said first electrical signals to produce a record which extends over a plurality of depth levels of electrical signals representative of a formation characteristic of said interval whereby said electrical signals representative of the formation characteristic of said interval can be further combined with other electrical signals to produce other electrical signals from which the presence and location of hydrocarbons in the subsurface earth formation for a plurality of depth levels can be accurately determined.

17. The method of claim 16 further comprising the steps of determining values of said derived electrical signals for consecutive depth levels and defining said first section as including a plurality of depth levels for which said determined values assume a first predetermined relationship.

18. The method of claim 17 further comprising the steps of declaring said first section upon occurrence of a preselected pattern of depth levels for which said derived electrical signals assume said first predetermined relationship.

19. The method of claim 18 further comprising the steps of declaring said second section as a barrier section on occurrence of values of said derived electrical signals which satisfy a second predetermined relationship for a preselected pattern of depth levels.

20. The method of claim 19 wherein said first section of the formation is primarily a sand zone and said second section is primarily a shale zone extending over a number of consecutive depth levels sufficient for forming an impermeable barrier above said sand zone.

21. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:

(a) providing a first plurality of electrical signals representative of characteristics of the formation over a plurality of depth levels of the borehole derived from signals responsive to the reaction of the subsurface earth formation to a plurality of probing signals emitted into the formation from a source of such probing signals located in said investigating device;

(b) combining said first electrical signals to define a plurality of formation intervals, each formation interval having a plurality of depth levels and having at least a first section comprising a relatively large amount of sand and a second section comprising a relatively large amount of shale;

(c) combining at least some of said first electrical signals in said first sections to produce further electrical signals representative of the hydrocarbon density for a plurality of depth levels in said first sections;

(d) combining said first electrical signals with said electrical signals representative of hydrocarbon density to produce electrical signals representative of the reliability of said first electrical signals; and (e) combining at least some of the reliable electrical signals representative of hydrocarbon density to produce a record which extends over a plurality of depth levels of output electrical signals representative of a value of hydrocarbon density for at least a plurality of depth levels for some of said formation intervals whereby said output electrical signals can be further combined to produce other electrical signals from which the presence and location of hydrocarbons in the subsurface earth formation for a plurality of depth levels can be determined.

22. The method of claim 21 wherein said output electrical signals represent an average of a plurality of consecutive reliable values of hydrocarbon density.

23. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of the subsurface earth formation to gamma rays emitted into said subsurface earth formation surrounding the borehole from a source of gamma rays located in said investigating device and producing therefrom further electrical signals representative of bulk density derived porosity for a plurality of formation depth levels;

(b) providing second electrical signals representative of the hydrogen content of the formation over a plurality of depth levels of the borehole, said second electrical signals being derived from signals responsive to the reaction of the subsurface earth formation to neutrons emitted into the subsurface each formation surrounding the borehole from a source of neutrons located in said investigating device and producing therefrom further electrical signals representative of hydrogen content derived porosity for a plurality of formation depth levels;

(c) providing a plurality of electrical signals representative of the presence of shale in a plurality of depth levels in the formation responsive to the reaction of the subsurface earth formation to probing signals emitted into said subsurface earth formation from said investigating device producing further electrical signals representative of the shale content in the formation for a plurality of depth levels;

(d) producing electrical signals primarily representative of the resistivity in the invaded zone of the formation for a plurality of depth levels in the formation responsive to the reaction of the subsurface earth formation to probing signals emitted into said subsurface earth formation from said investigating device;

(e) combining said electrical signals to produce first electrical signals representative of the hydrocarbon density and invaded water zone saturation for a plurality of formation depth levels in the formation;

(f) adjusting the values of the electrical signals representative of density derived porosity, hydrocarbon derived porosity, shale content and invaded water zone saturation to new values;

(g) combining said new values to produce second electrical signals representative of the hydrocarbon density for a plurality of formation depth levels; and (h) comparing said first and second electrical signals representative of the hydrocarbon density to produce a record which extends over a plurality of depth levels of the formation of still further electrical signals representative of hydrocarbon density whereby said further electrical signals can be further combined to produce other electrical signals from which the presence and location of hydrocarbons in the earth formation for a plurality of depth levels can be accurately determined.

24. The method of claim 23 wherein the step of adjusting said values comprises the step of combining at least some of said derived electrical signals to determine whether the formation comprises a relatively large amount of oil or gas and adjusting said values to first new values if the formation comprises a relatively large amount of oil and adjusting said values to second new values if the formation comprises a relatively large amount of gas.

25. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:

(a) providing a first plurality of electrical signals representative of characteristics of the formation over a plurality of depth levels of the borehole derived from signals responsive to the reaction of the subsurface earth formation to a plurality of probing signals emitted into the formation from a source of such probing signals located in said investigating device;

(b) combining at least some of said first electrical signals to produce first output electrical signals indicative of a value of hydrocarbon density at each depth level in said formation; and (c) combining at least some of said plurality of first electrical signals with said first output electrical signals to produce a record which extends over a plurality of depth levels of the second output electrical signals indicative of the reliability of said first output electrical signals whereby said second output electrical signals can be further combined to produce other electrical signals from which the presence and location of hydrocarbons in the subsurface earth formation for a plurality of depth levels can be accurately determined.

26. The method of claim 25 further comprising the step of combining a plurality of consecutive electrical signals indicative of reliable values of hydrocarbon density to produce a representation of a running average thereof.

27. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:

(a) providing a first plurality of electrical signals representative of characteristics of the formation over a plurality of depth levels of the borehole derived from signals responsive to the reaction of the subsurface earth formation to a plurality of probing signals emitted into the formation from a source of such probing signals located in said investigating device;

(b) preselecting values of electrical signals representative of the hydrocarbon density over defined intervals of the earth formation which includes a plurality of depth levels; and (c) combining said first electrical signals with said preselected electrical signals to produce a record which extends over a plurality of depth levels of first output electrical signals indicative of the hydrocarbon density at each depth level of the formation whereby said first output electrical signals can be combined to produce other electrical signals from which the presence and location of hydrocarbons within the subsurface earth formation for a plurality of depth levels can be accurately determined.

28. The method of claim 27 further comprising the step of combining said derived electrical signals with said first output electrical signals to produce second output electrical signals indicative of the reliability of said first output electrical signals.

29. The method of claim 28 further comprising the steps of producing electrical signals representing the running average electrical signals for said preselected electrical signals representative of hydrocarbon density to produce said first output electrical signals.

30. The method of claim 29 wherein the step of preselecting electrical signals representative of hydrocarbon density comprises the steps of combining said derived electrical signals to define a plurality of intervals of the earth formation and producing in each interval electrical signals representative of the hydrocarbon density at a plurality of depth levels, combining said derived electrical signals with said electrical signals representative of hydrocarbon density to produce further electrical signals representative of the reliability of said electrical signals representative of hydrocarbon density, combining said electrical signals representative of hydrocarbon density with said electrical signals representative of reliability of said representations of hydrocarbon density to produce still further electrical signals representative of the value of hydrocarbon density for each interval of the earth formation and utilizing said last named electrical signals as the preselected electrical signals representative of the hydrocarbon density over the interval.

31. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:

(a) providing a first plurality of electrical signals representative of characteristics of the formation over a plurality of depth levels of the borehole derived from signals responsive to the reaction of the subsurface earth formation to a plurality of probing signals emitted into the formation from a source of such probing signals located in said investigating device;

(b) combining at least some of said first electrical signals to define a formation interval including at least a first and second section, each section including a plurality of depth levels and having different formation characteristics and extending over a plurality of substantially contiguous depth levels for at least one of said sections; and (c) combining for said first section at least some of said first electrical signals to produce further electrical signals representative of formation characteristics at a plurality of depth levels of said first section whereby said further electrical signals can be further combined to produce other electrical signals from which the presence and location of hydrocarbons in the subsurface earth formation for a plurality of depth levels can be accurately determined.

* * * * *